United States Patent
Yi

(10) Patent No.: US 6,364,802 B1
(45) Date of Patent: Apr. 2, 2002

(54) HYDRAULIC CONTROL SYSTEM FOR A CONTINUOUSLY VARIABLE TRANSMISSION

(75) Inventor: Jae-Shin Yi, Suwon (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/577,144

(22) Filed: May 24, 2000

(30) Foreign Application Priority Data

Aug. 31, 1999 (KR) ............................................ 99-36417

(51) Int. Cl.$^7$ .............................................. F16H 33/00
(52) U.S. Cl. ........................ 475/121; 475/120; 475/127
(58) Field of Search .............................. 477/45; 474/18, 474/28; 475/42, 48, 49, 61, 69, 70, 120, 121, 127

(56) References Cited

U.S. PATENT DOCUMENTS

| | | | |
|---|---|---|---|
| 4,747,327 A | * 5/1988 | Itoh et al. ....................... | 477/45 |
| 4,827,805 A | * 5/1989 | Moan ........................ | 477/45 X |
| 5,086,671 A | * 2/1992 | Oshidari .................... | 477/45 X |
| 5,089,964 A | * 2/1992 | Morishige et al. ......... | 477/45 X |
| 5,269,726 A | * 12/1993 | Swanson et al. .............. | 474/28 |
| 5,409,421 A | * 4/1995 | Sakai et al. .................... | 474/28 |
| 6,019,700 A | * 2/2000 | Imai et al. ..................... | 477/45 |

FOREIGN PATENT DOCUMENTS

| | | | | |
|---|---|---|---|---|
| JP | 4029676 | * | 1/1992 | ................... 477/45 |
| JP | 5099302 | * | 4/1993 | ................... 477/45 |

* cited by examiner

Primary Examiner—Charles A. Marmor
Assistant Examiner—Ha Ho

(57) ABSTRACT

A hydraulic control system for a continuously variable transmission includes a pressure regulator, a shift controller, a forward/reverse controller, and a torque converter operation controller. The pressure regulator includes a primary regulator valve for regulating hydraulic pressure supplied from an oil pump, a first solenoid valve, a secondary regulator valve, and a solenoid supply valve. The shift controller includes a shift ratio control valve, and a second solenoid valve controlling the shift ratio control valve. The forward/reverse controller includes a pressure control valve, a third solenoid valve controlling the pressure control valve, a manual valve, and first and second friction elements acting respectively as forward and reverse operational elements. The torque converter operation controller includes a torque converter feed valve receiving hydraulic pressure from the pressure regulator, a lock-up clutch control valve, and a fourth solenoid valve controlling the lock-up clutch control valve. A single accumulator is mounted between the pressure control valve and the manual valve of the forward/reverse controller.

1 Claim, 2 Drawing Sheets

HYDRAULIC CONTROL SYSTEM FOR A CONTINUOUSLY VARIABLE TRANSMISSION

BACKGROUND OF THE INVENTION (a) Field of the Invention

The present invention relates to a hydraulic control system for a continuously variable transmission. More particularly, the present invention relates to a hydraulic control system for a continuously variable transmission in which only a single accumulator is used, thereby minimizing the number of elements in the hydraulic control system.

(b) Description of the Related Art

The transmission functions to deliver engine drive power to the drive wheels. There are three basic types of transmissions: (a) the manual transmission, in which the driver manipulates a shift lever to control shifting into different speeds and ranges; (b) the automatic transmission, in which shifting into the different forward speeds is automatically controlled according to various driving conditions; and (c) the continuously variable transmission, in which shifting is automatically performed over a single, large range and on a continuous basis when in either forward or reverse mode.

Among the different types of transmissions described above, the continuously variable transmission is ideal for many situations as it offers the convenience and ease of control of the automatic transmission, while providing many additional advantages such as reduced fuel consumption, enhanced power transmission performance, and reduced weight. In the continuously variable transmission, one pulley is mounted on an input shaft and another pulley is mounted on an output shaft, and a diameter of the pulleys is varied to realize shifting. Such a continuously variable transmission is referred to as a belt-type continuously variable transmission.

A hydraulic control system for controlling the belt-type continuously variable transmission will now be described with reference to FIG. 2.

Hydraulic flow is generated by an oil pump 102 to create hydraulic pressure in the hydraulic control system. This hydraulic pressure passes through a primary regulator valve 104 such that the hydraulic pressure undergoes initial control to a predetermined level of line pressure. The line pressure is then supplied to a secondary regulator valve 106 and a secondary pulley 108. The line pressure undergoes secondary control to a predetermined level in the secondary regulator valve 106, after which the line pressure is fed to a solenoid supply valve 110. The solenoid supply valve 110 distributes the hydraulic pressure to first, second, third and fourth solenoid valves S1, S2, S3 and S4. The line pressure supplied from the secondary regulator valve 106 is also supplied to a shift ratio control valve 111, a pressure regulator valve 114, and a torque converter feed valve 122.

The hydraulic pressure supplied to the shift ratio control valve 111 by the secondary regulator valve 106 is fed to a primary pulley 112 according to control by the second solenoid valve S2, thereby effecting changes in a diameter of the primary pulley 112. Such variations in the diameter of the primary pulley 112 result in gearless shifting.

Further, the hydraulic pressure supplied to the pressure regulator valve 114 by the secondary regulator valve 106 is then supplied to a manual valve 116 according to control by the third solenoid valve S3. The hydraulic pressure is subsequently supplied to a forward pressure line 118 or a reverse pressure line 120 depending on how the driver positions a select lever. If the hydraulic pressure is supplied to the forward pressure line 118, a first friction element C receives the hydraulic pressure, and if the hydraulic pressure is fed to the reverse pressure line 120, a second friction element B receives the hydraulic pressure.

The hydraulic pressure supplied to the torque converter feed valve 122 by the secondary regulator valve 106 is stabilized in the torque converter feed valve 122, then supplied to a lock-up clutch control valve 124. The lock-up clutch control valve 124 subsequently supplies the hydraulic pressure to the torque converter and elements requiring lubrication according to control by the fourth solenoid valve S4.

An accumulator 126 is provided on each of the forward pressure line 118 and the reverse pressure line 120. The accumulators 126 and 128 stabilize the operation of the first and second friction elements C and B respectively. In addition, a bypass line 132 is formed on the forward pressure line 118 and a bypass line 134 is formed on the reverse pressure line 120. Check valves 136 and 138 are provided on the bypass lines 132 and 134 respectively, the check valves 136 and 138 opening during the exhaust of hydraulic pressure to enable the quick exhaust of the hydraulic pressure. A safety valve 140 is provided on the reverse pressure line 120. The bypass line 134, the reverse pressure line 120, and the forward pressure line 118 are connected to the safety valve 140.

In the hydraulic control system with the above configuration, gearless shifting is realized in the forward range by variations in the diameter of the primary and secondary pulleys 112 and 108 in a state where hydraulic pressure is being supplied to the first friction element C, while gearless shifting is realized in the reverse range by variations in the diameter of the primary and secondary pulleys 112 and 108 in a state where hydraulic pressure is being supplied to the second friction element B.

However, in such a hydraulic control system, because an accumulator is applied at each of the friction elements C and B, the use of two accumulators utilizes a substantial amount of space, increases the weight of the system, and also acts to increase manufacturing costs.

SUMMARY OF THE INVENTION

The present invention has been made in an effort to solve the above problems.

It is an object of the present invention to provide a hydraulic control system for a continuously variable transmission in which a single accumulator is used to control two friction elements such that the weight and size of the hydraulic control system is reduced, and production costs are minimized.

To achieve the above object, the present invention provides a hydraulic control system for a continuously variable transmission comprising a pressure regulating means including a primary regulator valve for regulating hydraulic pressure supplied from an oil pump, a first solenoid valve, a secondary regulator valve, and a solenoid supply valve; a shift control means including a shift ratio control valve, and a second solenoid valve controlling the shift ratio control valve; a forward/reverse control means including a pressure control valve, a third solenoid valve controlling the pressure control valve, a manual valve, and first and second friction elements acting respectively as forward and reverse operational elements; and a torque converter operation control means including a torque converter feed valve receiving hydraulic pressure from the pressure regulating means, a lock-up clutch control valve, and a fourth solenoid valve controlling the lock-up clutch control valve, wherein a single accumulator is mounted between the pressure control valve and the manual valve of the forward/reverse control means.

According to a feature of the present invention, a bypass line is formed between the pressure control valve and the accumulator, and a check valve is provided on the bypass line, the check valve being able to block the flow of hydraulic pressure through the bypass line.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

Preferred embodiments of the present invention will now be described in detail with reference to the accompanying drawings.

Figure 1:
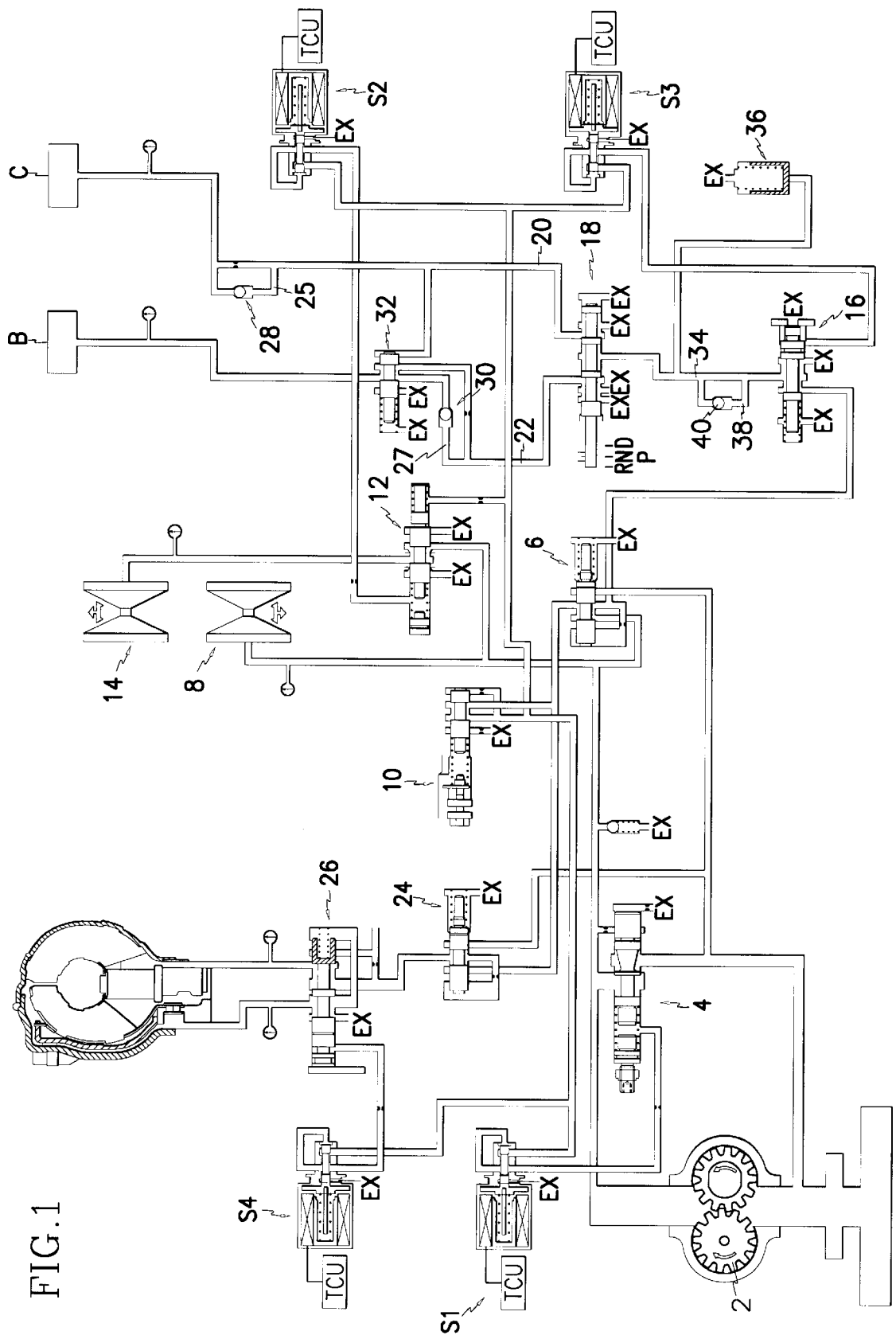
FIG. 1 is a hydraulic circuit diagram of a hydraulic control system for controlling belt-type continuously variable transmissions according to a preferred embodiment of the present invention.
Figure 2:
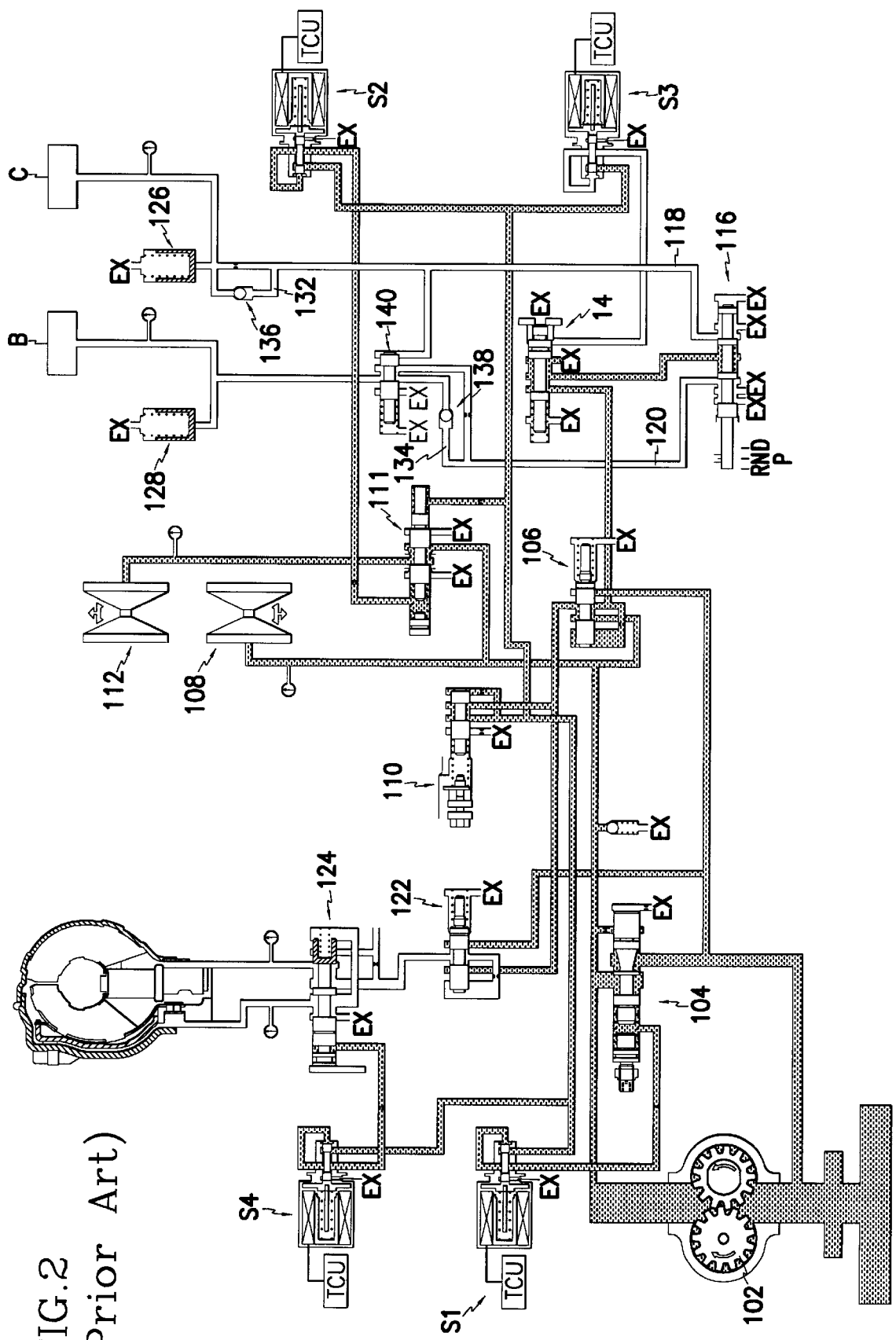
FIG. 2 is a hydraulic circuit diagram of a conventional hydraulic control system for controlling belt-type continuously variable transmissions.

FIG. 1 shows a hydraulic circuit diagram of a hydraulic control system for controlling belt-type continuously variable transmissions according to a preferred embodiment of the present invention.

Hydraulic flow is generated by an oil pump 2 to create hydraulic pressure in the hydraulic control system. This hydraulic pressure passes through a primary regulator valve 4 such that the hydraulic pressure undergoes initial control to a predetermined level of line pressure. The line pressure is then supplied to a secondary regulator valve 6 and a secondary pulley 8. The line pressure undergoes secondary control to a predetermined level in the secondary regulator valve 6, after which the line pressure is fed to a solenoid supply valve 10. The solenoid supply valve 10 distributes the hydraulic pressure to first, second, third and fourth solenoid valves S1, S2, S3 and S4. The line pressure supplied from the secondary regulator valve 6 is also supplied to a shift ratio control valve 12, a pressure control valve 16, and a torque converter feed valve 24.

The hydraulic pressure supplied to the shift ratio control valve 12 by the secondary regulator valve 6 is fed to a primary pulley 14 according to control by the second solenoid valve S2, thereby effecting changes in a diameter of the primary pulley 14. Such variations in the diameter of the primary pulley 14 result in gearless shifting.

Further, the hydraulic pressure supplied to the pressure control valve 16 by the secondary regulator valve 6 is then supplied to a manual valve 18 according to control by the third solenoid valve S3. The hydraulic pressure is subsequently supplied to a forward pressure line 20 or a reverse pressure line 22 depending on how the driver positions a select lever. If the hydraulic pressure is supplied to the forward pressure line 20, a first friction element C receives the hydraulic pressure, and if the hydraulic pressure is fed to the reverse pressure line 22, a second friction element B receives the hydraulic pressure.

The hydraulic pressure supplied to the torque converter feed valve 24 by the secondary regulator valve 6 is stabilized in the torque converter feed valve 24, then supplied to a lock-up clutch control valve 26. The lock-up clutch control valve 26 subsequently supplies the hydraulic pressure to the torque converter and elements requiring lubrication according to control by the fourth solenoid valve S4.

A bypass line 25 is formed on the forward pressure line 20 and a bypass line 27 is formed on the reverse pressure line 22. Check valves 28 and 30 are provided on the bypass lines 25 and 27 respectively, the check valves 28 and 30 opening during the exhaust of hydraulic pressure to enable the quick exhaust of the hydraulic pressure. Further, a safety valve 32 is provided on the reverse pressure line 22. The bypass line 27 of the reverse pressure line 22, the reverse line 22 itself, as well as a branch line of the forward pressure line 20 are connected to the safety valve 32.

In the hydraulic control system with the above configuration, gearless shifting is realized in the forward range by variations in the diameter of the primary and secondary pulleys 14 and 8 in a state where hydraulic pressure is being supplied to the first friction element C, while gearless shifting is realized in the reverse range by variations in the diameter of the primary and secondary pulleys 14 and 8 in a state where hydraulic pressure is being supplied to the second friction element B.

An accumulator 36 is mounted on a line 34 which supplies hydraulic pressure from the pressure control valve 16 to the manual valve 18. The accumulator acts to stabilize hydraulic pressure. Also, a bypass line 38 is formed on the line 34 between the pressure control valve 16 and a branch line connected to the accumulator 36. A check valve 40 is provided on the bypass line 38. The check valve 40 blocks the flow of hydraulic pressure through the bypass line 38 in an upstream direction, and enables the quick exhaust of release pressure.

With the mounting of the single accumulator 36 between the pressure control valve 16 and the manual valve 18 to control both the friction elements C and B, the weight and size of the hydraulic control system are reduced, and production costs are minimized.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A hydraulic control system for a continuously variable transmission comprising:

a pressure regulator including a primary regulator valve for regulating hydraulic pressure supplied from an oil pump, a first solenoid valve, a secondary regulator valve, and a solenoid supply valve;

a shift controller including a shift ratio control valve, and a second solenoid valve controlling the shift ratio control valve;

a forward/reverse controller including a pressure control valve, a third solenoid valve controlling the pressure control valve, a manual valve, and first and second friction elements acting respectively as forward and reverse operational elements;

a torque converter operation controller including a torque converter feed valve receiving hydraulic pressure from the pressure regulator, a lock-up clutch control valve, and a fourth solenoid valve controlling the lock-up clutch control valve; and a bypass line formed between the pressure control valve and an accumulator, and a check valve provided in the bypass line, the check valve being able to block the flow of hydraulic pressure through the bypass line, wherein the pressure control valve and the manual valve are connected to the accumulator.

* * * * *